United States Patent [19]

Nishimura et al.

[11] 4,158,725
[45] Jun. 19, 1979

[54] METHOD OF MANUFACTURING AN ADHESIVE

[75] Inventors: Makoto Nishimura; Keiichi Naito; Yoshio Fujiwara; Naotake Kobayashi, all of Utsunomiya, Japan

[73] Assignee: Sony Corporation, Tokyo, Japan

[21] Appl. No.: 872,108

[22] Filed: Jan. 25, 1978

[30] Foreign Application Priority Data

Jan. 31, 1977 [JP] Japan .................................. 52-9462

[51] Int. Cl.² .............................................. C08F 8/32
[52] U.S. Cl. .................................................. 526/52.1
[58] Field of Search ........................................ 526/52.1

[56] References Cited

U.S. PATENT DOCUMENTS

| 2,781,335 | 2/1957 | Cupery | 526/52.1 |
| 3,133,854 | 5/1964 | Simms | 526/52.1 |
| 3,551,391 | 12/1970 | Crocker et al. | 526/52.1 |
| 3,674,896 | 7/1972 | Purcell et al. | 526/52.1 |
| 3,720,637 | 3/1973 | Bacskai | 526/52.1 |
| 3,778,418 | 12/1973 | Nakayamo | 526/52.1 |

*Primary Examiner*—William F. Hamrock
*Attorney, Agent, or Firm*—Hill, Van Santen, Steadman, Chiara & Simpson

[57] ABSTRACT

A method for the manufacture of an adhesive suitable for use with polyvinylfluoride sheets which includes the steps of copolymerizing a vinyl compound and a vinyl compound having an epoxy group and then treating the copolymer thus produced with aqueous ammonia to aminate the epoxy group.

10 Claims, 2 Drawing Figures

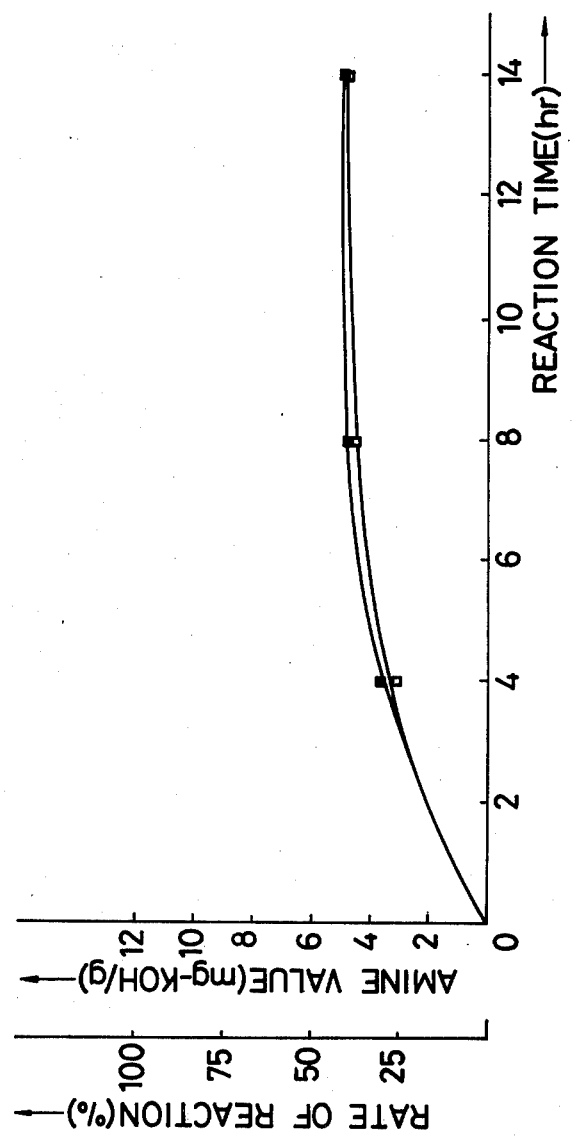

METHOD OF MANUFACTURING AN ADHESIVE

BACKGROUND OF THE INVENTION

1. Field of the Invention

This invention relates to the manufacture of adhesives consisting of aminated copolymers of a vinyl compound and a vinyl compound having at least one epoxy group.

2. Description of the Prior Art

In recent times, significant use has been made of polyvinylfluoride sheets for laminated structures which, for example, are used as wall covering materials since they have superior weather resistance, wear resistance and solvent resistance. The polyvinylfluoride sheets are marketed under the trade name "Tedlar" by E. I. duPont de Nemours & Co. In the polyvinylfluoride polymer, one hydrogen atom is substituted by one fluorine atom for each ethylene unit of polyethylene. An adhesive to be used for attaching the "Tedlar" film or sheet to the surface of a metal such as aluminum must have various requirements, for example, it should have high adhesiveness, high cohesiveness, a stability to hydrolysis and the like. If the adhesive does not meet these requirements, the film or sheet is apt to be peeled from the surface of the metal, and the polyvinylfluoride cannot be used effectively.

Adhesives for "Tedlar" film or sheet materials are disclosed in Japanese Patent Official Gazettes No. 18530/1963, (corresponding to U.S. Pat. No. 3,133,854), No. 26763/1963 and No. 11918/1967 to E. I. duPont de Nemours & Co. These adhesives are manufactured in a process in which one or more types of (meth)acrylates are copolymerized with a small amount of a monomer having an epoxy group, and gaseous ammonia or a primary monoamine are reacted with the resulting copolymer. The adhesive thus obtained consists of a (meth)acrylate polymer having an amino group or an imino group on the side chain.

The "Tedlar" film to be attached to the substrate may also be surface treated in a special manner as described in Japanese Patent Official Gazettes No. 18530/1963 and 11918/1967. We have investigated the adhesive properties of the surface treated "Tedlar" produced according to these disclosures. An (meth)acrylic polymer having a carboxyl group, a hydroxyl group, and amide group or a carbonyl group as functional groups on the side chain exhibited little adhesiveness to the "Tedlar." An (meth)acrylic polymer having glycidyl groups at the side chain exhibited some adhesiveness to the "Tedlar." However, such adhesiveness was not particularly satisfactory.

In the manufacture of the above described adhesives, gaseous ammonia is fed into an autoclave containing the copolymer under pressures on the order of 10 Kg/cm$^2$ for a long time such as 12 hours to cause the ammonia to react with the copolymer. Such manufacturing methods have the disadvantage that they require a special reaction vessel which is resistive to the pressure conditions, and which can handle gaseous ammonia. Furthermore, after the end of the reaction, the interior of the reaction vessel has to be put under a relatively low pressure such as 100 mmHg by a vacuum pump to discharge the remaining ammonia gas.

SUMMARY OF THE INVENTION

The present invention provides an improved manufacturing method for producing an adhesive which overcomes the disadvantages of the existing methods. The method of the present invention requires no special reaction vessels and can be operated in air at normal pressures.

In accordance with the present invention, the improved adhesive is manufactured by copolymerizing a vinyl compound with a vinyl compound having an epoxy group and then reacting the copolymer thus produced with aqueous ammonia to aminate the same.

BRIEF DESCRIPTION OF THE DRAWINGS

FIG. 2 is a graph showing the relationship between reaction time and rate of reaction and the amine value for adhesives produced according to examples Nos. 6 and 7 of this specification.

DESCRIPTION OF THE PREFERRED EMBODIMENTS

Figure 1:
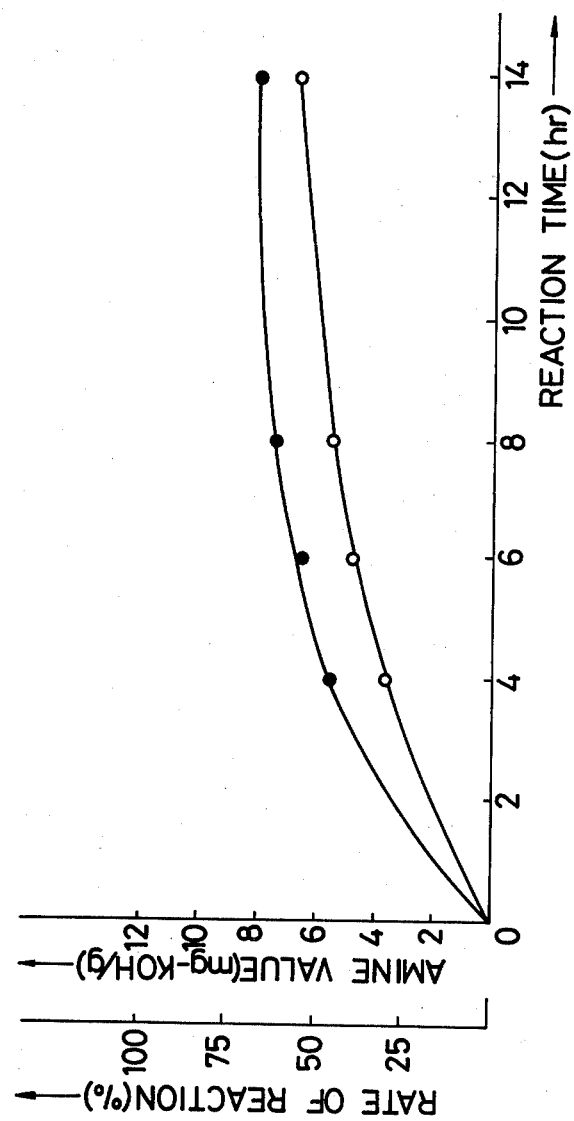
FIG. 1 is a graph showing the relationship between reaction time and the rate of reaction and the amine value for adhesives produced according to examples Nos. 4 and 5 of this specification.

To form the copolymer which is modified by aqueous ammonia according to the present invention, it is preferable that the vinyl compound which is reactive with the vinyl compound with epoxy group be composed mainly of acrylic acid esters or methacrylic acid esters. The vinyl compound may be composed essentially of acrylic acid esters or methacrylic acid esters derived from an alcohol having 1 to 8 carbon atoms in its molecule.

Examples of acrylic acid esters are methyl acrylate, ethyl acrylate, n-propyl acrylate, isopropyl acrylate, n-butyl acrylate, tertiary butyl acrylate, amyl acrylate, n-hexyl acrylate, cyclohexyl acrylate, 2-ethyl hexyl acrylate and the like.

Examples of methacrylic acid esters are methyl methacrylate, ethyl methacrylate, n-propyl methacrylate, n-butyl methacrylate, n-amyl methacrylate, 3-methylpentyl mmethacrylate, n-hexyl methacrylate, 2-methyl hexyl methacrylate, 2-ethyl hexyl methacrylate, n-heptyl methacrylate, n-octyl methacrylate and the like.

One part of acrylic ester or methacrylic acid ester of alcohol of 1 to 8 carbon atoms used as the vinyl compound other than vinyl group compound having epoxy group may be substituted by vinyl compound of other kind to be used for the pressure sensitive or hot-melt type adhesive. In this case, less than 20 parts by weight, or preferably less than 10 parts by weight of 100 parts by weigh of acrylic ester or methacrylic acid ester of alcohol of 1 to 8 carbon atoms are substituted by vinyl group compound of the other kind.

Examples of vinyl group compound for substitution are as follows:

(1) Acrylic acid ester of methacrylic acid ester derived from alcohol having 8 to 18 carbon atoms.

(2) Vinyl compound having one or two carboxyl groups such as acrylic acid, methacrylic acid, crotonic acid, maleic acid, and itaconic acid.

(3) Vinyl compound having a hydroxyl group such as 2-hydroxyethylacrylate, 2-hydroxypropylacrylate, 2-hydroxyethylmethacrylate, 2-hydroxypropylmethacrylate.

(4) Vinyl compound having an amide group such as acrylamide, metahcryl amide, N-methylolacryl amide, and N-methylolmethacryl amide.

(5) Other vinyl compounds such as vinyl chloride, vinyl propionate, acrylonitrile and vinyl acetate.

The copolymer to be modified with ammonia according to the present invention is obtained from the above described vinyl compounds and the vinyl epoxy type compounds. In the case of a pressure sensitive type adhesive, it is required that the glass transition temperature (Tg) of the copolymer after being aminated be in the range of −85° to 0° C. For the hot-melt type adhesive, the glass transition temperature (Tg) of the copolymer after amination should be in the range of 40° to 80° C.

When the Tedlar film with the hot melt type adhesive is used as an overlay film for poly vinyl chloride film, it has been found out that the copolymer composed of 0 to 30% by weight of ethylacrylate and 70 to 100% by weight of methylmethacrylate except the vinyl group compound having epoxy group is particularly preferable.

Examples of the vinyl group compounds having epoxy groups usable for this invention are glycidyl methacrylate, glycidyl acrylate, glycidyl oxyethyl vinyl sulfide, glycidyl sorbate, glycidyl vinylphthalate, glycidyl acryl phthalate, glycidyl acryl maleate, glycidyl acryl ether, butadiene monoepoxide, vinyl cyclohexane epoxide, glycidyl lycinolate and the like and mixture of two or more of them. Glycidyl metahcrylate and glycidyl acrylate are particularly preferable. Even though they are small molecularly, they can be easily copolymerized with the vinyl compound, and the vinyl group can rapidly and substantially completely react with the vinyl group compound.

It is preferable that the copolymer of the vinyl compound with the epoxy having compound have an average molecular weight of 50,000 to 500,000. A copolymer having a molecular weight of less that 50,000 is brittle or fragile, and the mechanical strength of such a copolymer is low. A copolymer having a molecular weight of more than 500,000 has too high a viscosity, and the reaction velocity of such a copolymer in the subsequent reaction is low, and the gelatinization is apt to occur.

It is preferable that the ratio of the vinyl compound having the epoxy group to the whole copolymer of the vinyl compounds is in the range of 1 to 10% by weight. When it is less than 1% by weight, the adhesive obtained has a low amine value (as described hereinafter) and a poor adhesiveness. When the epoxy compound is present in amounts more than 10% by weight, the copolymer itself is apt to gelatinize. A range of 2 to 5% by weight is more preferable from the viewpoint of the amine value and the prevention of gelation.

In the method according to the present invention, the vinyl compound such as methymethacrylate and ethyl acrylate is reacted with the vinyl compound containing the epoxy group, such as glycidyl methacrylate to obtain a base polymer in accordance with the following reaction:

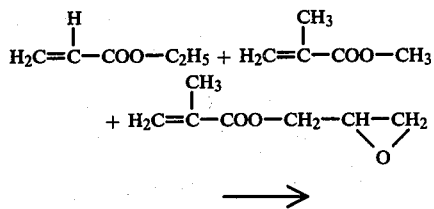

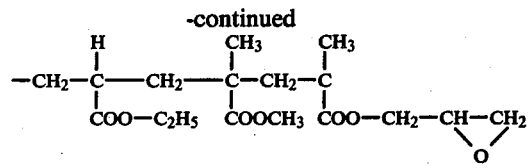

The material produced in the above reaction is hereinafter represented in short form as follows:

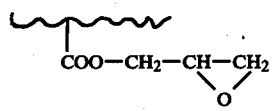

Since all of the reactants have vinyl groups, they are addition polymerized at a predetermined temperature or a predetermined time under an atmosphere of inert gas such as nitrogen gas to produce a copolymer having an epoxy group at the end of the side chain.

The important feature of the present invention is to react the above produced copolymer with aqueous ammonia. An aqueous solution of ammonium hydroxide is made to react on the produced copolymer in the following manner:

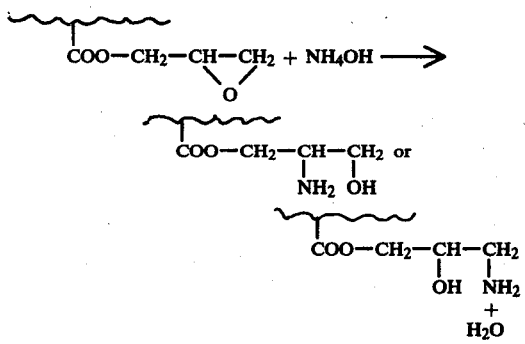

As shown in the above reactions, the epoxy group ring is subject to cleavage, and an amino group is chemically combined with the released bond of the carbon atom constituting a part of the epoxy group. Thus, an aminated or ammoniated polymer is obtained.

In the above reaction, since ammonia is introduced in the form of an aqueous solution, the pressure of the interior of the reaction vessel may be as low as one atmosphere. No special type of reaction vessel is required. For example, a reaction vessel made of glass and an operation in air can be satisfactorily applied for the method of the present invention. It is very easy to handle ammomia water in contrast to gaseous ammonia.

The amination reaction can be carried out at various predetermined temperatures for various periods of time. However it is preferable that a catalyst be used to accelerate the reaction. We found out that amination without catalyst causes the high probability of gelatinization during the amination reaction, and the low data value reproduction of the amine value. The amine values are very random, text by text, in the case of no application of the catalyst. When catalyst is applied in this amination process, the aminated polymer is stably manufactured. Such a catalyst is preferably an amine compound. Examples of suitable amine compounds are the aliphatic primary amines, aliphatic secondary amines, aliphatic tertiary amines, aliphatic unsaturated amines, alicyclic amines, aromatic amines and the like, and mixtures of two or more of these amines. Examples of aliphatic primary amines are methyl amine, ethyl amine, propyl amine, isopropyl amine, butyl amine, amyl amine, hexyl amine, heptyl amine, octyl amine, and the like, or mixtures of two or more of these materials. Examples of aliphatic secondary amines are dimethyl amine, diethyl amine, dipropyl amine, diisopropyl amine, dibutyl amine, diamyl amine, and the like, and mixtures of two or more of these. Examples of aliphatic tertiary amines are trimethyl amine, triethyl amine, tripropyl amine, tributyl amine, triamyl amine, or the like, or mixtures of two or more of these. Examples of aliphatic unsaturated amines are allyl amine, diallyl amine, triallyl amine, and the like, or mixtures of two or more. Examples of alicyclic amines are cycloproplyl amine, cyclobutyl amine, cyclopentyl amine, cyclohexyl amine and the like, or mixtures of two or more. Examples of aromatic amines are aniline, methyl aniline, dimethyl aniline, ethyl aniline, diethyl aniline, o-toluidine, m-toluidine, p-toluidine, benzyl amine, dibenzyl amine, tribenzyl amine, diphenyl amine, triphenyl amine, $\alpha$-naphthyl amine, $\beta$-naphthyl amine, and the like, and mixtures of two or more of these. Heterocyclic amine compounds having an imidazole group can also be used as catalysts for the reaction according to this invention.

Other amine compounds may be used in which a hydrogen atom is substituted by a functional group such as a halogen atom, a hydroxyl group, or a hydrocarbon radical in the above named amine compounds. Further diamine compounds may be used wherein the residue of one amine compound from which a hydrogen atom is removed is substituted for a hydrogen atom of another amine compound. Further, a triamine compound or other high molecular weight amine compound may also be used.

The amination reaction is rapidly accelerated by using the amine catalyst. Accordingly, operation conditions such the reaction time can be greatly improved. The operation of the method according to the present invention is thus very simple in comparison with the operation of the conventional method in which the reaction is made to occur under conditions of high pressure without a catalyst. The most preferably amine catalysts are the tertiary amines, followed by the secondary amines, and then the primary amines.

It is preferred that 0.005 to 0.5 parts by weight of the amine catalyst is used for every 100 parts by weight of the base polymer.

The concentration of the aqueous ammonia used for the reaction is from 5 to 30% ammonia by weight. When it is less than 5% by weight, the reaction velocity is too low and it is difficult to obtain a highly aminated copolymer. When the concentration is more than 30% by weight, much ammonia is volatilized during the reaction.

The required amount of aqueous ammonia is such that the ammonia content is more than equivalent to the epoxy group of the base polymer, i.e., there should be more than one molecule of ammonia for each epoxy group. From the standpoint of compatibility with the solution of the base polymer, it is preferable that up to 100 parts by weight of aqueous ammonia having a concentration within the range given is used for 100 parts by weight of the base polymer.

The upper and lower limits for the reaction temperature are determined in relation to the reaction velocity and the volatility of ammonia. The most practical range of reaction temperatures is 20° to 90° C., and the preferable range is 60° to 80° C.

The required reaction time depends on the desired amine value. A practical range is 2 to 10 hours, and the preferable range is 6 to 8 hours.

It is preferable that the amine value of the polymer thus produced is in the range from 1 to 30. Even more preferable, the amine value of the polymer should be in the range of 2 to 30. When the amine value is less than 1, the adhesive strength is too low. When the amine value is greater than 30, the epoxy group becomes predominate, and the base polymer is apt to gel upon reaction.

The adhesive produced according to the present invention is obtained in solution. A small amount of pigment, filler, plasticizer, fluidity-adjuster, dispersing agent, antioxidant, ultraviolet absorbing agent, or materials having film forming properties may be added to the adhesive solution.

The surface treated "Tedlar" film or sheet is coated with the adhesive coating according to this invention. The coated "Tedlar" film or sheet is then laminated on a film or sheet of polyvinyl chloride. The laminated material may be used for interior design. Or a laminated material obtained by laminating the "Tedlar" film or sheet to metal may be used for external design purposes.

The method of determining the amine value of the adhesive according to the present invention will now be described.

First methanol is added to a sample of the adhesive to separate the resin content. The separated resin is dissolved in methylethyl ketone, and then formed into film. The film is dried at a temperature of 60° C. for 10 minutes. This film is used for measuring the amine value. In the measurement, 5 grams of a sample are put into a conical flask having a volume of 200 ml. 35 ml of a solvent such as acetone is poured into the conical flask. The total content of the sample solution in the conical flask becomes 50 ml. Next, bromophenol blue (0.1% methanol solution) as an indicator is added into the sample solution in the conical flask. Then, the sample solution is titrated with a methanol solution of 0.02 N HCl. The color of the sample solution changes from blue to yellowish green, and then to yellow. The titration is ended at a time when the color of the sample solution remains yellow for 30 seconds.

The amine value is represented by the following equation:

$$\text{Amine value (mg-KOH/g)} = (N \times F \times 56.1 \times B)/S$$

wherein N represents the normality of the HCl, F is the titer of the HCl, B is the required amount (ml) of HCl and S is the weight of the sample.

Next, a method of measuring the adhesion strength will be described. The surfaces of "Tedlar" films of 12, 25 and 38 microns in thickness were coated with the adhesive so that the adhesive thickness was 3 to 8 microns in the dry condition. The coated "Tedlar" films were dried at a temperature of 60° to 80° C. for 1 to 2 minutes. Then, a film of polyvinyl chloride which contained about 25 to 35% plasticizer and sold under the name "M205" by San Poh Resin Co. was superposed through the adhesive onto the "Tedlar" film. Then, the polyvinyl chloride film was pressed to the "Tedlar" film with a hot roller which was operated at a temperature of 130° to 150° C., at a pressure of 5 Kg/cm. Peeling tests of the "Tedlar" films were made on the thus obtained laminated material.

The following examples illustrate manufacturing methods for producing adhesive according to the present invention.

First, in order to produce the base polymer, predetermined amounts of methylmethacrylate (MMA), ethylacrylate (EA), glycidyl methacrylate (GMA), azobisisobutyronitrile (AIBN: radical-polymerization initiator), toluene (solvent) and isopropyl alcohol (IPA: solvent) were compounded with each other, and introduced into a reaction vessel.

Next, the compound was made to react with stirring at a predetermined temperature (for example, 80° C.) for a predetermined time (for example, 7 hours) under $N_2$ gas at one atmosphere. Thus, a solution of acryl polymer as the base polymer was obtained. Then, predetermined amounts of methylethyl ketone (MEK) and IPA are added into the acryl polymer solution to dilute the latter and lower the viscosity of the latter.

Next, predetermined amounts of an aqueous solution of ammonia ($NH_4OH$) and IPA for affinity with solvent, and, as occasion demands, an amine catalyst are compounded with each other for 100 parts of acryl polymer solution, and introduced into the reaction vessel. The mixture is made to react at a predetermined temperature (for example, 70° C.) for a predetermined time (for example, 6 to 12 hours) under one atmosphere pressure. The amination takes place in air, although a nitrogen atmosphere can also be used. In the case of examples 4 to 10 a part of the aqueous ammonia is added by titration during the amination process. Consequently, the amount of aqueous ammonium referred to previously includes the amount used for titration. Thus, an aminated acryl polymer is produced.

Next, the aminated acryl polymer is heated by blowing air at a predetermined temperature (for example, 70° C.) for a predetermined time (4 to 8 hours) under one atmosphere pressure. Thus, excess ammonia is removed. At the same time, the solvent is also removed. As a result, the aminated acryl polymer adhesive according to this invention remains in the reaction vessel.

Next, the embodiments of this invention will be described, but this invention is not limited to these embodiments. For facilitation of the understanding of the examples, data for them are shown by Table I and Table IIa and Table IIb. In these examples, AIBN was used as the free radical initiator. However, other initiators such as benzoyl peroxide, tert-butyl peroxide, tert-butyl peroxybenzoate, tert-butyl peroxylaurate, decanoyl peroxide, lauroyl peroxide, azobispropyronitrite, and azobiscyanovaleric acid may also be used.

TABLE I

| | (using no catalyst) | | | |
|---|---|---|---|---|
| Example No. | 1 | 2 | 3 | Manufacturing process |
| M M A | 68.5 parts | 67.0 parts | 67.0 parts | Polymerization reaction at a temperature |
| E A | 30.0 parts | 30.0 parts | 30.0 parts | of 80° C. for 7 hours under $N_2$ gas pressure |
| G M A | 1.5 parts | 3.0 parts | 3.0 parts | of one atmosphere |
| A I B N | 0.2 parts | 0.2 parts | 0.2 parts | |
| Toluene | 50.0 parts | 50.0 parts | 50.0 parts | |
| I P A | 50.0 parts | 50.0 parts | 50.0 parts | |
| M E K | 66.5 parts | 66.5 parts | 66.5 parts | Dilution |
| I P A | 66.5 parts | 66.5 parts | 66.5 parts | |
| (Total) | (333.2 parts) | (333.2 parts) | (333.2 parts) | |
| Solid content (theoretical value)* | 30% | 30% | 30% | |
| Viscosity | 420 cps | 220 cps | 220 cps | |
| Solid content (actual value)* | 31.0% | 29.2% | 29.2% | |
| Acryl polymer** | 100 parts | 100 parts | 100 parts | Amination at a temperature of 70° C. for 8 hours under one atmosphere pressure |
| 28% $NH_4OH$ | 6.6 parts | 13.2 parts | 2.6 parts | |
| I P A | 20.0 parts | 20.0 parts | 20.0 parts | |
| (Total) | (126.6 parts) | (133.2 parts) | (122.6 parts) | Removal of ammonia at a temperature of 70° C. for 5 hours. Aeration |
| Solid content (theoretical value)* | 23.7% | 22.5% | 24.5% | |
| Viscosity | 1200 cps | 1850 cps | 180 cps | |
| Solid content (actual value)* | 31.8% | 26.1% | 24.5% | |
| Amine value | 4.0 | 1.5 | 1.0 | |
| Adhesion Strength | Tedlar broken | Tedlar peeled | Tedlar peeled | |
| Appearance | Light yellow transparent | Light yellow transparent | Light yellow transparent | |

*Solid content remaining after removal of solvent
**Solution of acryl polymer as base polymer TABLE II a

| | (using catalyst) | | | | |
|---|---|---|---|---|---|
| Example No. | 4 | 5 | 6 | 7 | Manufacturing process |
| M M A | 87.0 parts | 87.0 parts | 87.0 parts | 87.0 parts | Polymerization reaction |
| E A | 10.0 parts | 10.0 parts | 10.0 parts | 10.0 parts | at a temperature of 80° C. |
| G M A | 3.0 parts | 3.0 parts | 3.0 parts | 3.0 parts | for 7 hours under $N_2$ gas |
| A I B N | 0.4 parts | 0.4 parts | 0.4 parts | 0.4 parts | of one atmosphere pressure |
| Toluene | 50.0 parts | 50.0 parts | 50.0 parts | 50.0 parts | |

TABLE II a-continued

| Example No. | 4 | 5 | 6 | 7 | Manufacturing process |
|---|---|---|---|---|---|
| | | (using catalyst) | | | |
| I P A | 50.0 parts | 50.0 parts | 50.0 parts | 50.0 parts | |
| M E K | 66.5 parts | 66.5 parts | 66.5 parts | 66.5 parts | Dilution |
| I P A | 66.5 parts | 66.5 parts | 66.5 parts | 66.5 parts | |
| (Total) | (333.4 parts) | (333.4 parts) | (333.4 parts) | (333.4 parts) | |
| Solid content (theoretical value)* | 30% | 30% | 30% | 30% | |
| Viscosity | 500 cps | 500 cps | 500 cps | 500 cps | |
| Solid content (actual value)* | 30% | 30% | 30% | 30% | |
| Acryl polymer** | 100 parts | 100 parts | 100 parts | 100 parts | Amination at a temperature of 70° C. for 6 to 12 hours |
| 28% NH$_4$OH | 7.9 parts | 7.9 parts | 7.9 parts | 7.9 parts | |
| I P A | 12.0 parts | 12.0 parts | 12.0 parts | 12.0 parts | |
| Catalyst | 0.03 parts | 0.03 parts | 0.03 parts | 0.1 parts | |
| 28% NH$_4$OH | 5.3 parts | 5.3 parts | 5.3 parts | 5.3 parts | Titration of ammonia water for 1 to 3 hours under one atmosphere |
| I P A | 8.0 parts | 8.0 parts | 8.0 parts | 8.0 parts | |
| (Total) | (133.23 parts) | (133.23 parts) | (133.23 parts) | (133.23 parts) | Removal of ammonia at a temperature of 70° C. for 4 to 8 hours. Aeration |
| Solid content (Theoretical value)* | 22.5% | 22.5 | 22.5 | 22.5% | |
| Viscosity | 300 cps | 480 cps | 830 cps | 120 cps | |
| Solid content (actual value)* | 25% | 25% | 25% | 25% | |
| Amine value | 8.0 | 6.6 | 4.8 | 4.8 | |
| Adhesion strength | Tedlar broken | Tedlar broken | Tedlar broken | Tedlar broken | |
| Appearance | Light yellow, transparent | Light yellow transparent | Light yellow, transparent | Light yellow, transparent | |
| Catalyst name | Triethanol amine | Tri-2, 4, 6-dimethyl-aminomethyl-phenol | Triethyl amine | Triethyl amine | |

*Solid content remaining after removal of solvent
**Solution of acryl polymer as base polymer

TABLE II b

| Example No. | 8 | 9 | 10 | Manufacturing Process |
|---|---|---|---|---|
| | | (using catalyst) | | |
| M M A | 87.0 parts | 37.0 parts | 37.0 parts | Polymerization reaction at a temperature |
| E A | 10.0 parts | 60.0 parts | 60.0 parts | of 80° C. for 7 hours under N$_2$ gas of one |
| G M A | 3.0 parts | 3.0 parts | 3.0 parts | atmosphere pressure. |
| A I B N | 0.4 parts | 0.4 parts | 0.4 parts | |
| Toluene | 50.0 parts | 50.0 parts | 50.0 parts | |
| I P A | 50.0 parts | 50.0 parts | 50.0 parts | |
| M E K | 66.5 parts | 66.5 parts | 66.5 parts | Dilution |
| I P A | 66.5 parts | 66.5 parts | 66.5 parts | |
| (Total) | (333.4 parts) | (333.4 parts) | (333.4 parts) | |
| Solid content (theoretical value)* | 30% | 30% | 30% | |
| Viscosity | 500 cps | 210 cps | 210 cps | |
| Solid content (actual value)* | 30% | 30% | 30% | |
| Acryl polymer** | 100 parts | 100 parts | 100 parts | Amination at a temperature of 70° C. for 6 to 12 hours |
| 28% NH$_4$OH | 11 7.9 parts | 7.9 8.9 parts | 6.5 parts | |
| I P A | 12.0 parts | 13.2 parts | 10.3 parts | |
| Catalyst | 0.03 parts | 0.03 parts | 0.03 parts | |
| 28% NH$_4$OH | 5.3 parts | 7.6 parts | 9.0 parts | Titration of ammonia water for 1 to 3 hours under one atmosphere |
| I P A | 8.0 parts | 11.3 parts | 13.2 parts | |
| (Total) | (133.23 parts) | (140.63 parts) | (139.03 parts) | Removal of ammonia at a temperature of 70° C. for 4 to 8 hours. Aeration |
| Solid content (theoretical value)* | 22.5% | 21.3% | 21.6% | |
| Viscosity | 360 cps | 420 cps | 560 cps | |
| Solid content (actual value)* | 25% | 24.2% | 24.8% | |
| Amine value | 7.8 | 6.9 | 6.3 | |
| Adhesion | Tedlar | Tedlar | Tedlar | |

TABLE II b-continued

| Example No. | 8 | 9 | 10 | Manufacturing Process |
|---|---|---|---|---|
| | | (using catalyst) | | |
| strength | broken | broken | broken | |
| Appearance | Light yellow, transparent | Light yellow, transparent | Light yellow, transparent | |
| Catalyst | Monoethanol amine | Diethylene triamine | Aniline | |

*Solid content remaining after removal of solvent
**Solution of acryl polymer as base polymer As seen in the above Table I, even in the case where no catalyst is used in the amination reaction, relatively high amine values such as 1.5 to 4.0 can be obtained. However, when the amine value is less than 2.0, the "Tedlar" film is likely to be peeled, and so the adhesion strength is not very high.

As seen in Table IIa and Table IIb, when a catalyst is used in the amination reaction, the amine value is high and the adhesive is satisfactory. Although it is preferable that a teritary amine be used as the catalyst, a primary amine also has significant effect. It is also preferable that the reaction time for the amination be about 8 hours.

The amine values of the adhesives obtained by using a catalyst according to the invention were measured by the methanol separation method, and these values were higher than conventional adhesives as shown in the following Table III.

TABLE III

| Sample | Amine Value |
|---|---|
| Example 4 | 8.0 |
| Example 5 | 6.6 |
| Acryl polymer (not aminated) | 0.1 |
| #6880 adhesive for internal design, manufactured by Dupont | 4.0 |

FIGS. 1 and 2 show the relationships between the reaction time and the rates of reaction or the amine values in the amination reaction for examples 4 to 7. Data for example No. 4 are shown by the solid circles in FIG. 1. Data for example No. 5 are shown by the open circles in FIG. 1. As clear from FIG. 1, the amine values of the adhesives of examples Nos. 4 and 5 are higher than the amine value (4.0) of a conventional adhesive. Since aqueous ammonia is made to react upon a high molecular weight substance, namely an acryl polymer, the amounts of aqueous ammonia should be more than equivalent to that of GMA. The mol ratio is 1:3.5 in the above examples. The mol ratio of GMA to aqueous ammonia may be varied in suitable ranges.

Data for example No. 6 are shown by the open squares in FIG. 2. Data for example No. 7 are shown in the solid squares in FIG. 2. As clear from FIG. 2, the adhesives of examples 6 and 7 are inferior to the adhesives of examples 4 and 5 but the amine values of the adhesives of examples 6 and 7 are higher than the amine values of a conventional adhesive.

It will be evident that various modifications can be made to the described embodiments without departing from the scope of the present invention.

We claim as our invention:

1. A method for the manufacture of an adhesive comprising the steps of:
   copolymerizing (a) vinyl compounds capable of copolymerizing with (b) vinyl compounds containing epoxy groups that produce a copolymer having an average molecular weight of from 50,000 to 500,000, said vinyl compounds, (a), containing for every 100 parts by weight, at least 80 parts by weight of an acrylic or methacrylic acid ester of an alcohol containing 1 to 8 carbon atoms, the amount of epoxy compounds, (b), being from 1 to 10% by weight of the entire copolymer,
   treating the resulting copolymer with aqueous ammonia in the presence of an amine catalyst in an amount of from 0.005 to 0.5 parts by weight per 100 parts by weight of copolymer to produce an aminated copolymer having an amine value of from 1 to 30, said amine catalyst being present in sufficient amounts to substantially prevent gelatinization during the amination reaction.

2. A method according to claim 1 in which said acrylic or methacrylic acid ester is selected from the group consisting of methyl acrylate, ethyl acrylate, n-propyl acrylate, isopropyl acrylate, n-butyl acrylate, tertiary butyl acrylate, amyl acrylate, n-hexyl acrylate, cyclohexyl acrylate, 2-ethyl hexyl acrylate, methyl methacrylate, ethyl methacrylate, n-propyl methacrylate, n-butyl methacrylate, n-amyl methacrylate, 3-methyl-pentyl methacrylate, n-hexyl methacrylate, 2-methyl hexyl methacrylate, 2-ethyl hexyl methacrylate, n-heptyl methacrylate, n-octyl methacrylate and mixtures thereof.

3. A method according to claim 1 in which said vinyl compounds with epoxy groups are selected from the group consisting of glycidyl methacrylate, glycidyl acrylate, glycidyl oxyethyl vinyl sulfide, glycidyl sorbate, glycidyl vinylphthalate, glycidylacryl phthalate, glycidyl acryl maleate, glycidyl acryl ether, butadiene monoepoxide, vinyl cyclohexane epoxide, glycidyl lycinolate and mixtures thereof.

4. A method according to claim 1 in which the ratio of the vinyl epoxy compound to the entire copolymer is in the range of 2 to 5% by weight.

5. A method according to claim 1 in which said amine catalyst is selected from the group consisting of aliphatic primary amines, aliphatic secondary amines, aliphatic tertiary amines, aliphatic unsaturated amines, alicyclic amines, aromatic amines and mixtures thereof.

6. A method according to claim 1 in which said aqueous ammonia contains 5 to 30% by weight ammonia.

7. A method according to claim 1 in which the amount of aqueous ammonia is sufficient to provide more than one molecule of ammonia for each epoxy group.

8. A method according to claim 1 in which the amination reaction is carried out at a temperature of from 20° to 90° C.

9. A method according to claim 1 in which the amination reaction is carried out at a temperature of from 60° to 80° C.

10. A method according to claim 1 in which the amine value of the resulting copolymer is in the range of from 2 to 30.

* * * * *